United States Patent [19]

Peelle, III

[11] Patent Number: 4,775,032

[45] Date of Patent: Oct. 4, 1988

[54] ELEVATOR CONTROL

[75] Inventor: H. E. Peelle, III, Poughkeepsie, N.Y.

[73] Assignee: The Peelle Company, Bay Shore, N.Y.

[21] Appl. No.: 40,559

[22] Filed: Apr. 17, 1987

[51] Int. Cl.⁴ ........ B66B 3/02

[52] U.S. Cl. ........ 187/134; 187/136

[58] Field of Search ........ 187/134, 136

[56] References Cited

U.S. PATENT DOCUMENTS 3,415,344 12/1968 Abe et al. ........ 187/134

4,354,171 10/1982 Yoshida ........ 187/134

4,368,518 1/1983 Terazono et al. ........ 187/136 X

FOREIGN PATENT DOCUMENTS 2065058 6/1981 United Kingdom ........ 187/134

2068877 8/1981 United Kingdom ........ 187/134

*Primary Examiner*—William M. Shoop, Jr.

*Assistant Examiner*—W. E. Duncanson, Jr.

*Attorney, Agent, or Firm*—Pearne, Gordon, McCoy & Granger

[57] ABSTRACT

Elevator control apparatus for monitoring the floor position of a car utilizing a switch on the car to sense floor indicator cams each spaced along the hoistway in regular spatial relation to an associated floor. The control apparatus includes means to register signals from the floor switch while knowing the simultaneous direction of car travel to thereby enable it to distinguish ascent to a higher floor and descent to a lower floor. The control apparatus also includes means to disregard false signals from the floor switch resulting from car bounce and mid-floor reversals of car direction.

4 Claims, 3 Drawing Sheets

PROGRAM LISTING

| OPERATION CODE | RELAY NO (DATA) |
|---|---|
| LD | 12 |
| OR | 13 |
| AND NOT | 78 |
| AND NOT | 11 |
| OUT | 82 |
| | |
| LD | 91 |
| AND | 13 |
| LD NOT | 91 |
| AND | 12 |
| OR LD | |
| AND | 82 |
| OUT | 83 |
| | |
| LD | 87 |
| AND | 83 |
| LD NOT | 87 |
| AND NOT | 83 |
| OR LD | |
| AND NOT | KR6 |
| LD | 87 |
| AND NOT | 83 |
| AND | KR6 |
| OR LD | |
| AND | 82 |
| LD | 12 |
| OR | 13 |
| AND NOT | 82 |
| AND NOT | 78 |
| OR LD | |
| OUT | 76 |
| | |
| LD | 78 |
| AND NOT | 11 |
| LD NOT | 78 |
| AND NOT | 76 |
| OR LD | |
| TIM3 | 004 (.4 SEC) |

| OPERATION CODE | RELAY NO (DATA) |
|---|---|
| LD | 83 |
| LD | 82 |
| AND | KR6 |
| AND NOT | 83 |
| OR | 80 |
| KR | 6 |
| | |
| LD NOT | 11 |
| AND | 79 |
| OUT | 80 |
| | |
| LD | 87 |
| AND | 11 |
| OR | 79 |
| LD | 12 |
| OR | 13 |
| AND LD | |
| LD | 12 |
| OR | 13 |
| AND NOT | 78 |
| AND | 11 |
| OR LD | |
| AND NOT | 80 |
| OUT | 79 |
| | |
| LD | 12 |
| OR | 13 |
| OUT | 78 |
| | |
| LD | 11 |
| AND NOT | 78 |
| AND | 87 |
| AND NOT | KR6 |
| OUT | 81 |
| | |
| LD | 79 |
| OR | 81 |
| OUT | 90 |

| OPERATION CODE | RELAY NO (DATA) |
|---|---|
| LD | 81 |
| AND NOT | 91 |
| OR | 12 |
| AND | 90 |
| LD NOT | 90 |
| AND | 91 |
| OR LD | |
| OUT | 91 |
| | |
| LD | 78 |
| OR | 81 |
| | OUTPUT TO FPREC |
| | |
| LD | 81 |
| AND | 91 |
| OR | 13 |
| | OUTPUT TO DPDC |
| | |
| LD | 11 |
| AND | 87 |
| AND NOT | KR6 |
| | OUTPUT TO CFPC |
| LD | 11 |
| AND | 87 |
| | OUTPUT TO FSCC |
| | |
| LD | TIM3 |
| AND | 78 |
| LD NOT | 78 |
| AND | 87 |
| AND NOT | 81 |
| OR LD | |
| OUT | 87 |

FIG. 3

ELEVATOR CONTROL

BACKGROUND OF THE INVENTION

The invention relates to improvements in automatic elevator control and, in particular, pertains to a system for monitoring the floor location of a car.

PRIOR ART

Residential and non-complex commercial elevator systems typically have a single car for transporting correspondence, parcels, material, or passengers between a plurality of vertically spaced floors or landings. The car can be dispatched automatically from one floor to another by pressing a push button in a control panel on the car corresponding to the desired floor, or pressing a push button at the service door of the floor to which the car is to be called. The automatic controller requires a signal when the car passes or arrives at a different floor in order to monitor its location, ascertain what direction of movement is required, and to stop it at the desired floor.

Commonly, in prior art systems, the position of the car is indicated by a series of separate electrical switches each fixed along the hoistway in relation to an associated floor and each adapted to be operated by proximity or contact with the car. Each switch has a separate wire or wires for feeding appropriate signals to the controller which, typically, is located at one end of the hoistway. These separate floor switches, besides contributing to the basic manufacturing costs of an elevator system, add significantly to installation labor costs.

SUMMARY OF THE INVENTION

The invention provides novel control apparatus for an elevator car which utilizes a single switch mounted on the car to indicate the passing or arrival of the car at successive floors. Signals from this floor switch are processed to provide a controller with data enabling the controller to keep track of the car's physical location and thereby permit the controller to cause the car to be raised or lowered as required. The control apparatus includes means to monitor the direction of travel of the car and thereby determine whether a floor switch signal represents a descent to a lower floor or an ascent to a higher floor.

In the preferred embodiment, the floor switch signal output is conditioned by special circuits which block any false signals that could result from switch or car bounce or from a mid-floor reversal of car direction.

During a start of the car adjacent a floor, cable stretch or other factors may cause the car and/or the floor switch to bounce, with the result that a false signal is generated by the floor switch. In accordance with the invention, the signal conditioning circuitry prevents transmittal of any false floor switch signal occurring immediately after the car starts and before it moves to a zone well above (or below) the floor.

The signal conditioning circuitry, further, includes means for blocking an initial floor switch signal occurring after the car reverses direction between floors and then returns to the floor it has most recently departed. Thus, the blocked signal cannot be considered by the controller as an indication of a change in floor position.

By appropriately blocking false signals, the control apparatus allows a single floor switch to be used to monitor the position of the car. The invention thus avoids the initial expense of separate switches at each floor as used in the prior art for this purpose, as well as the field wiring of such multiple switches during installation and any maintenance attributed to them.

BRIEF DESCRIPTION OF THE DRAWINGS

FIG. 3 is a program listing by which the controller operates.

DESCRIPTION OF THE PREFERRED EMBODIMENT

Figure 1:
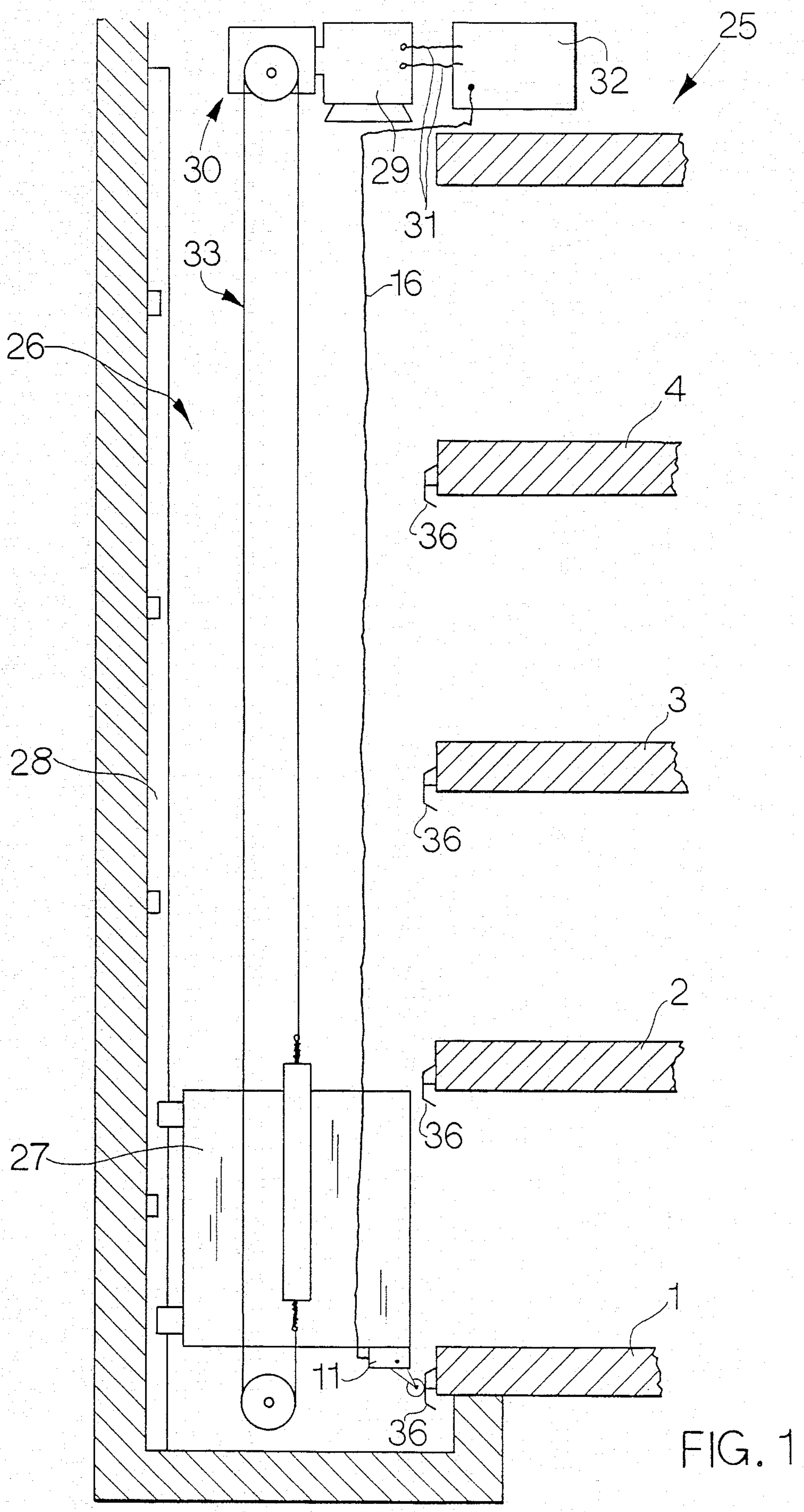
FIG. 1 is a schematic representation of a hoistway in which an elevator car travels between vertically spaced floors.

Referring now to the drawings, and particularly to FIG. 1, there is shown an elevator system 25 in a building or other static structure. The system 25 includes a vertical shaft or hoistway 26 in which a car 27 is guided for vertical movement along a path determined by guide rails 28 in a generally conventional manner. The car 27 is driven vertically between a series of landings or floors 1–4 by a motor 29 of a machine schematically represented at 30. In the illustrated case, the motor 29 is a reversible electric motor energized through electrical power lines 31 connected to a controller 32. The motor 29 lifts and lowers the car 27 through a cable system 33. Operation of the motor 29 is determined by the controller 32 which incorporates the control elements represented in FIG. 2.

The car 27 moves between and/or stops at floors 1–4 in response to push button signals initiated manually at individual landings or on the car 27. While only four floors are illustrated, it will be understood that a greater number can be served by the system of the disclosed controller 32. The controller 32 monitors the floor location of the car 27 with a register 34 of the controller that is responsive to a sensing device in the form of an electrical switch 11 fixed on the car 27. This floor switch 11 senses cams 36 individually associated with each floor 1–4, and sends electrical signals (e.g., of a known voltage) to the controller 32 when its normally open and normally closed contacts change state during engagement of the switch with one of such cams upon arrival of the car at a floor. The spatial relation of each cam 36 to its associated floor 1–4 is the same.

The controller 32 registers signals from the switch 11 along with other information to monitor the actual position of the car 27. The controller 32 is embodied as a microprocessor that operates according to the program listing represented in FIG. 3. A commercially available microprocessor suitable for sequentially performing the steps of FIG. 3 is marketed in the United States under the trademark OMRON by Omron Electronics, Inc., Schaumburg, Ill.

As the car 27 reaches a particular floor 1–4, the floor switch 11 is actuated by the related cam or floor indicator 36. The floor switch 11 sends signals to the controller 32 along wires 16. Incorporated in the microprocessor controller 32 are status relays 76, 78, 79, 80, 81, 82, 83, 87, 90, 91, an internal timer TIM 3 anad a latch relay KR6.

The motor 29 is operated through conventional motor contactors. The motor coil contactor for raising the car 27 is connected to output contacts 12 of a controller relay 12 and the motor contactor coil for lowering the car is connected to output contacts 13 of a similar relay 13.

The elements of the controller 32 of FIG. 2 operate in the following manner. The controller 32 monitors the actual position of the car 27 by registering the signals received from the switch 11 and the simultaneous direction of car travel as indicated by the corresponding active motor contactor relay 12 or 13 at the time of switch actuation. In ideal circumstances, a signal from the floor switch (normally open contacts 11 closed) while the motor 29 is running in the up direction (relay 12 on) means that the car has moved to the next highest floor, while, conversely, a like signal from the switch 11 with the motor running in the down direction (relay 13 on) means that the car has moved to the next lowest floor.

The following describes the operation of the microprocessor controller 32 to prevent double counting of a floor if the floor switch is not in contact with a floor. cam when the car starts running. Should the car begin to run with the floor switch 11 off of a floor cam and travel toward the last registered floor cam (the floor cam last in contact with the floor switch, while the car was running, is its last registered floor cam), the register 34 could otherwise be incremented when the floor switch contacted this cam, thus placing the physical floor location of the car out of sequence with the implied location of the car assumed by the register. Also described is the operation of the controller 32 to prevent erroneous signals due to unwanted contact between the floor switch and a floor cam (i.e., contact bounce).

Figure 2:
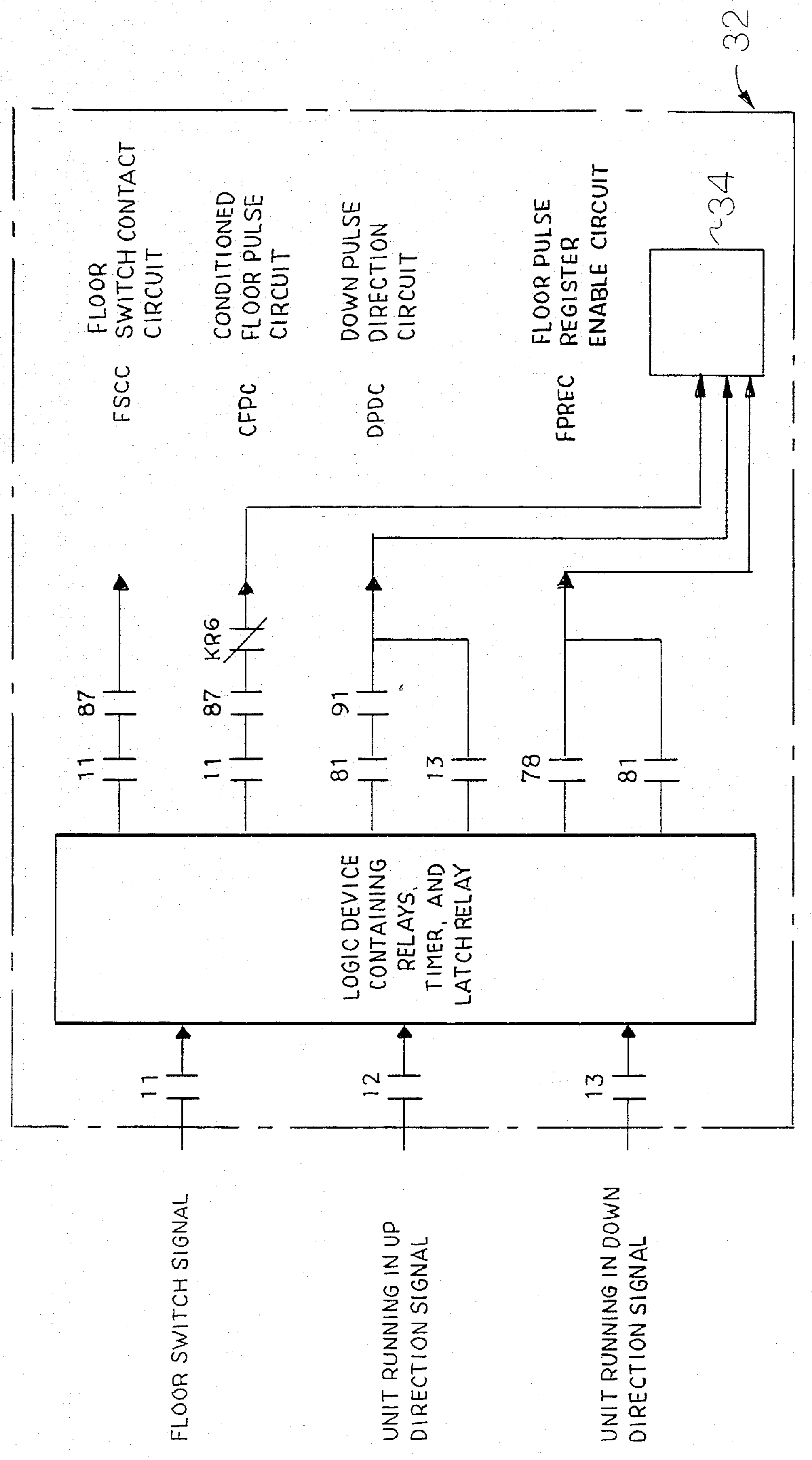
FIG. 2 is a schematic diagram of an elevator control apparatus constructed in accordance with the invention.

As indicated in FIG. 2, three signals are provided to the controller 32: (1) a circuit from the floor switch that closes each time the floor switch contacts a floor cam (normally open contact 11): (2) a circuit indicating that the car is running and is running in the upward direction (normally open contact 12); (3) a circuit indicating that the car is running and is running in the downward direction (normally open contact 13).

Four circuits are provided by the controller: (1) a floor switch contact circuit (FSCC) which is bounce-protected, this circuit consisting of a normally open contact 11 in series with a normally open contact 87; (2) a conditioned floor pulse circuit (CFPC) which contains the FSCC in conjunction with double count protection, this circuit consisting of the FSCC in series with a normally closed contact KR6; (3) a floor pulse register enable circuit (FPRES) which provides a signal indicating that a valid floor pulse will be generated and the register should be ready to receive those signals, this circuit consisting of a normally open contact 78 in parallel with a normally open contact 81; (4) a down pulse direction circuit (DPDC) which indicates that the conditioned floor pulse circuit is generating pulses that indicate that the floor that is being registered is below the previous floor, and if the down pulse direction circuit is off, it indicates that the floor that is being registered is above the previous floor. As indicated in FIG. 2, the latter three of these circuits are fed to the register 34 which increments up if the CFPC is energized, the DPDC is not energized, and the FPREC is energized, and which increments down if the CFPC, DPDC, and FPREC are all energized.

Floor Switch Contact Circuit (FSCC):

If the car begins to run in a direction away from the floor cam last registered with the floor switch off but very near the floor cam, the floor switch may come into contact with that cam if the car bounces at start. With the car running, just after the floor switch leaves a floor cam, the floor switch may re-contact that cam, if the car is bouncing. Similarly, if rough spots exist on the floor cam, the floor switch may bounce, causing off-on pulses while traveling on the floor cam. Any of these conditions will cause an erroneous pulse to be generated by the floor switch.

The FSCC contact circuit activates only when the floor switch initially contacts a floor cam. Once the initial contact has occurred, the FSCC contact circuit does not activate again until the floor switch has traveled a sufficient distance away from that floor cam. This is achieved through the creation of two imaginary zones, with reference to each floor, where the floor switch is (1) on or just above (or below) the registered floor cam, and (2) well above (or below) the registered floor cam.

While the floor switch is in the well above (or below) the registered floor cam zone, the floor switch is far enough away from the floor cam that unintended contact between the floor switch and the registered floor cam cannot occur. Thus, if contact does occur, it is with the floor cam that the car is heading toward, and thus the FSCC contact circuit should be activated to allow the CFPC to activate and a floor pulse to be generated.

Once contact has occurred between the floor switch and that floor cam, and the FSCC contact circuit has been activated, any additional contact that occurs between the floor switch and the floor cam will not activate the FSCC contact circuit until the floor switch has traveled a sufficient distance away from the floor cam. Until such time, the floor switch is in the on or just above (or below) the registered floor cam zone.

When the car stops, the current zone that the floor switch is located in is retained by activating a status relay in the microprocessor controller 32. When the car starts to run, the zone, if different than currently retained, is changed at start.

The floor switch is in the on or just above (below) the floor cam zone when:

(1) the floor switch, with the car running, has contacted a floor cam;
(2) the floor switch, with the car running, has just left a floor cam;
(3) the car starts to travel with the floor switch on a floor cam;
(4) the car stopped with the floor switch in the on or just above (below) the floor cam zone and then starts to travel in the same direction traveled prior to the stop;
(5) The car stopped with the floor switch in the well above (below) the floor cam zone and then starts to travel in the opposite direction traveled prior to the stop.

The floor switch is in the well above (below) the floor cam zone when:

(1) the floor switch, with the car running, has not contacted a floor cam for a set period of time as determined by timer TIM3, which is required for the car to move from its on or just above (below)

the floor cam zone to the well above (below) the floor cam zone;

(2) the car stopped with the floor switch in the on or just above (below) the floor cam zone and then starts to travel in the opposite direction traveled prior to the stop;

(3) the car stopped with the floor switch in the well above (below) the floor cam zone and then starts to travel in the same direction traveled prior to the stop.

Conditioned Floor Pulse Circuit (CFPC):

The conditioned floor pulse circuit operates by comparing the direction of travel when the floor switch was last in contact with a floor cam with the car direction initiated at a start. If the car starts running in an opposite direction and the floor switch is off of the floor cam, the controller 32 prevents the CFPS from generating pulses until: (1) the floor switch leaves the floor cam first encountered or (2) the car stops before reaching a floor cam, then runs in the same direction that it ran in after last contact with a floor cam occurred.

It is assumed that if the floor switch is off of a floor cam at start, the floor switch is: (1) above the last registered floor cam, if the direction of travel after last leaving a floor cam was up, and (2) below the last registered floor cam, if the direction of travel after last leaving a floor cam was down. This assumption is valid in the following conditions:

(1) If the car, after running in the up direction, stops between floors, the floor switch must be above the last registered floor cam. A similar condition exists if the car ran in the down direction;

(2) if the car stops with the floor switch on a floor cam, the combination of normal stopping slide and brake slide will force the floor switch to travel a sufficient distance on to the floor cam to ensure that the floor switch will not lose contact with the floor cam in a direction opposite to that in which it traveled to the floor. Thus, if the car stopped, after running in the up direction, with the floor switch on a floor cam, and then started with it off of a floor cam, which would occur if brake slide was excessive, the floor switch would be above the floor cam. A similar condition exists if the car ran in the down direction.

This assumption does not apply if the car stops with the floor switch very near an unregistered floor cam. Brake slide or cable stretch may cause the floor switch to come into contact with the unregistered floor cam. The car is now located at the floor above, if the car was running up. If the floor cams are sufficiently long, the floor switch will not overrun the floor cam in the above condition (the floor cams must be longer than the distance traveled due to brake slide). Thus, if the car starts with the floor switch off of a floor cam, it would be below the floor cam. A similar condition exists if the car ran in the down direction. This condition is corrected for by reversing the state of the associated status relay in the controller 32, indicating the direction of travel when the floor switch was last in contact with a floor cam while the car was running. If the car ran upward, it is changed to running down, and if the car ran downward, it is changed to running up. By changing the direction of travel, the assumption remains valid.

Down Pulse Direction Circuit (DPDC)

The down pulse direction circuit is activated when the car's direction of travel is downward. It remains inactive if the car's direction of travel is upward or the car is immobile except when contact occurs with an unregistered floor cam as discussed below.

Floor Pulse Register Enable Circuit (FPREC):

The floor pulse register enable circuit is activated whenever the car is running. It remains inactive while the car is immobile except when contact occurs with an unregistered floor cam as discussed below.

Contact with An Unregistered Floor Cam After A Car Stop Is Initiated

The controller 32 compensates for floor switch contact with an unregistered floor cam after the car stops. If a car stop is initiated with the floor switch very near the unregistered floor cam above the floor cam last registered, with the car traveling in an upward direction before stopping, or very near the unregistered floor cam below the floor cam last registered, with the car traveling in a downward direction before stopping, brake slide, cable stretch, or car bounce may cause the floor switch to come into contact with the unregistered floor cam. Thus, at a subsequent start, the floor switch may or may not be on the floor cam. If off the floor cam at start, the floor switch would be below the floor cam, not above, as assumed by the CFPC, if the direction of travel when the normal floor switch was last in contact with a floor cam while running was up, or above the floor cam, not below, if the direction of travel was down. If on the floor cam at start, it would be assumed that the floor cam had been registered.

When contact occurs between the floor switch and an unregistered floor cam: (1) the FSCC is activated, indicating that the floor switch has contacted a floor cam; (2) the CFPC is activated, thus, generating a valid floor switch pulse; (3) the FPREC is activated, thus allowing the floor pulse register to accept the valid floor switch pulse; (4) the DPDC is activated if the floor cam contacted is below the floor cam last registered; (5) the stored direction of travel after last registering a floor cam is reversed; (6) the floor switch zone is changed from well above the floor cam to just below the floor cam, or from well below the floor cam to just above the floor cam.

After the first pulse has been generated, the FSCC, CFPC, DPDC, and the FPREC do not generate additional signals in response to additional floor switch pulses while the car remains immobile.

Distinguishing between an unregistered floor cam and a registered floor cam is achieved through the use of the two zones discussed previously, where the floor switch exists: (1) on or just above (or below) the registered floor cam, and (2) well above (or below) the registered floor cam.

Contact with a registered floor cam or with an unregistered floor cam is determined in the following manner: If the normal floor switch is either in the well above the floor cam zone or the well below the floor cam zone, any contact that occurred was with an unregistered floor cam. If the normal floor switch is either in the on or just above the floor cam zone or in the on or just below the floor cam zone, any contact that occurred was with a registered floor cam.

While the invention has been shown and described with respect to a particular embodiment thereof, this is for the purpose of illustration rather than limitation, and other variations and modifications of the specific embodiment herein shown and described will be apparent to those skilled in the art, all within the intended spirit and scope of the invention. Accordingly, the patent is not to be limited in scope and effect to the specific embodiment herein shown and described, nor in any other way that is inconsistent with the extent to which the progress in the art has been advanced by the invention.

What is claimed is:

1. Elevator apparatus comprising a vertical path extending between a series of vertically spaced landings, a car in the path, drive means to raise and lower the car in the path, indicator means associated with each landing, sensing means on the car operative to generate a signal in response to an encounter with an indicator means, a controller for monitoring the position of the elevator, the controller having circuit means to indicate the direction of car travel, and means responsive to a signal from the sensing means whereby the controller is enabled to distinguish through the sensing means and direction indicating circuit means an ascent or a descent of the car to a different floor, said controller including means to isolate a signal from the sensing means to the responsive means until the car moves from a zone where the sensing means encounters or nearly encounters the indicator means to a zone well away from the indicator means whereby false signals due to car bounce and a resulting inadvertent encounter between the sensing means and indicator means are ignored.

2. Elevator apparatus comprising a vertical path extending between a series of vertically spaced landings, a car in the path, drive means to raise and lower the car in the path, indicator means associated with each landing, sensing means on the car operative to generate a signal in response to an encounter with an indicator means, a controller for monitoring the position of the elevator, the controller having circuit means to indicate the direction of car travel, and means responsive to a signal from the sensing means whereby the controller is enabled to distinguish through the sensing means and direction indicating circuit means an ascent or a descent of the car to a different floor, said controller including means independent of interaction between the sensing means and the indicator means to isolate a signal from the sensing means to the responsive means when the car after leaving a landing in one direction stops and is thereafter driven in the opposite direction prior to reaching another landing.

3. A method of controlling the position of an elevator car, comprising the steps of providing a plurality of indicating means along the path of the car each corresponding to a landing served by the car and sensing means on the car responsive to the indicator means to generate a signal when the car encounters a landing, monitoring the position of the car with a controller that is responsive to signals from the sensing means and to signals representing the up or down movement of the car at the moment of each encounter of the car with a landing, and upon start of the car ignoring generated signals occurring while the car is in a zone where the sensing means is adjacent the indicating means.

4. A method as set forth in claim 3, wherein, upon dispatch of a car from a landing in one direction, a stop of the car prior to reaching another landing, and a single reversal of the car direction, the next generated signal is ignored.

* * * * *